US007992933B2

(12) United States Patent
Yetukuri et al.

(10) Patent No.: US 7,992,933 B2
(45) Date of Patent: Aug. 9, 2011

(54) INTEGRATED VEHICLE SEAT WITH ACTIVE HEAD RESTRAINT SYSTEM

(75) Inventors: Arjun Yetukuri, Rochester Hills, MI (US); Mladen Humer, East Pointe, MI (US); Gerald Locke, Lake Orion, MI (US); Won-Tai Kim, Seoul (KR)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 11/766,439

(22) Filed: Jun. 21, 2007

(65) Prior Publication Data
US 2008/0315636 A1 Dec. 25, 2008

(51) Int. Cl.
*B60N 2/42* (2006.01)
*B60N 2/427* (2006.01)
*B60N 2/48* (2006.01)

(52) U.S. Cl. .................................. 297/216.12
(58) Field of Classification Search ............. 297/216.12
See application file for complete search history.

(56) References Cited

U.S. PATENT DOCUMENTS

| 4,674,797 | A | | 6/1987 | Tateyama |
| 5,020,855 | A | | 6/1991 | Lindberg et al. |
| 5,664,841 | A | | 9/1997 | Dal Monte |
| 5,882,060 | A | | 3/1999 | Walk et al. |
| 6,082,817 | A | * | 7/2000 | Muller ............... 297/216.12 |
| 6,550,856 | B1 | | 4/2003 | Ganser et al. |
| 6,688,697 | B2 | * | 2/2004 | Baumann et al. .... 297/216.12 X |
| 6,715,829 | B2 | | 4/2004 | Svantesson et al. |
| 6,802,562 | B1 | | 10/2004 | Hake et al. |
| 6,805,411 | B2 | | 10/2004 | Gramss et al. |
| 6,957,858 | B2 | | 10/2005 | Yetukuri et al. |
| 6,983,989 | B1 | | 1/2006 | Veine et al. |
| 7,008,019 | B2 | | 3/2006 | Lampke et al. |
| 7,048,336 | B2 | | 5/2006 | Mawbey et al. |
| 7,070,235 | B2 | | 7/2006 | Schilling et al. |
| 7,073,856 | B2 | * | 7/2006 | Akaike et al. ............ 297/216.12 |
| 7,111,901 | B2 | | 9/2006 | Schlierf et al. |
| 7,195,313 | B2 | * | 3/2007 | Hippel et al. ............ 297/216.12 |
| 7,344,191 | B2 | * | 3/2008 | Schilling et al. ......... 297/216.12 |

(Continued)

FOREIGN PATENT DOCUMENTS
DE  3042802 A1  6/1982
(Continued)

OTHER PUBLICATIONS

Non-Final Office Action mailed Apr. 18, 2011 in U.S. Appl. No. 12/049,589, filed Mar. 17, 2008, 18 pgs.

*Primary Examiner* — Rodney B. White
(74) *Attorney, Agent, or Firm* — Brooks Kushman P.C.

(57) ABSTRACT

A seat back for a vehicle seat is provided. The seat back has a frame, a head restraint, and an active head restraint system. The frame provides structure for the seat back and is adapted to be mounted within a vehicle. The frame has a back support portion to support a back of an occupant, and a head restraint portion to support a head of an occupant. In one embodiment, the head restraint is supported by the head restraint portion of the frame and is moveable relative to the frame to an extended position to provide support to the head of the occupant during an impact condition. The active head restraint system is operatively connected to the head restraint for moving the head restraint to the extended position when the active head restraint system is activated.

20 Claims, 5 Drawing Sheets

U.S. PATENT DOCUMENTS

| | | |
|---|---|---|
| 7,484,797 B2 * | 2/2009 | Akaike et al. ............ 297/216.12 |
| 2001/0040396 A1 | 11/2001 | Kreuels et al. |
| 2005/0077762 A1 | 4/2005 | Kraemer et al. |
| 2005/0116515 A1 | 6/2005 | Schlierf et al. |
| 2005/0168020 A1 | 8/2005 | Yetukuri et al. |
| 2006/0071518 A1 | 4/2006 | Hippel et al. |
| 2006/0226688 A1 | 10/2006 | Terada et al. |
| 2006/0279114 A1 * | 12/2006 | Toda et al. ................ 297/216.12 |
| 2007/0085400 A1 | 4/2007 | Terada et al. |
| 2007/0241593 A1 * | 10/2007 | Woerner .................. 297/216.12 |
| 2007/0246989 A1 * | 10/2007 | Brockman ........... 297/216.12 X |
| 2008/0252113 A1 * | 10/2008 | Alexander et al. ....... 297/216.12 |

FOREIGN PATENT DOCUMENTS

| | | |
|---|---|---|
| DE | 10 2006 035352 A1 | 4/2007 |
| EP | 1724148 A1 | 11/2006 |
| WO | 87/03256 A1 | 6/1987 |
| WO | 2008/014850 A2 | 2/2008 |
| WO | 2008/095636 A1 | 8/2008 |

* cited by examiner

INTEGRATED VEHICLE SEAT WITH ACTIVE HEAD RESTRAINT SYSTEM

BACKGROUND

1. Technical Field

Various embodiments of the invention relate to active head restraints for vehicle seats.

2. Background Art

Vehicle seats are provided with moveable head restraints for moving to an impact position in response to a signal or force imparted to the seat before or during an impact condition. One example of a vehicle seat having a movable head restraint is disclosed in U.S. Pat. No. 6,983,989 B1, which issued on Jan. 10, 2006.

DETAILED DESCRIPTION OF EMBODIMENTS OF THE INVENTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

Figure 1:
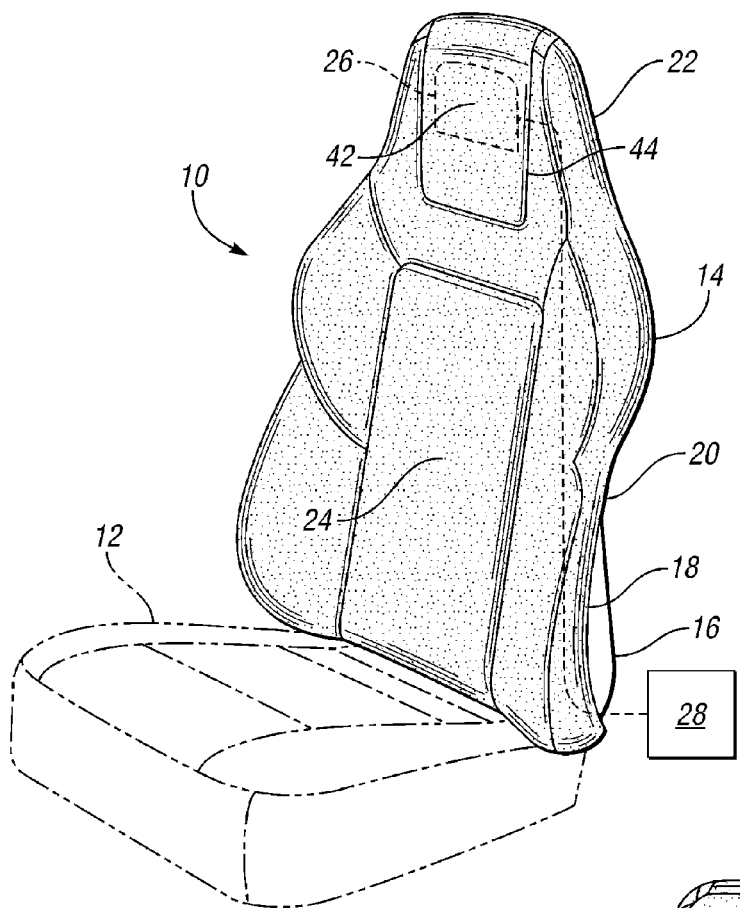
FIG. 1 is a perspective view of an embodiment of a vehicle seat illustrated in a design position.

Referring to FIG. 1, a vehicle seat is illustrated and referenced generally by numeral 10. The vehicle seat includes a seat bottom 12 secured to a floor of an associated vehicle for seating an occupant upon the seat bottom 12. A seat back 14 extends from the seat bottom 12 and is secured relative to the seat bottom 12 for supporting a back of the occupant against the seat back 14. The seat back 14 may pivot relative to the seat bottom 12 to permit ingress and egress to and from a rear seating row and/or to permit an occupant to select a comfortable riding position while sitting in the vehicle seat 10.

In one embodiment, the seat back 14 includes a frame 16 for providing structural support for the seat back 14. Cushioning 18 is mounted on the frame 16 to support the occupant. The cushioning 18 may include foam, padding, bolsters and/or support wires. A cover 20 rests over the cushioning 18 to conceal the cushioning 18. Any suitable cushioning 18 and cover 20 such as those known in the art may be mounted on the frame 16.

As illustrated, the frame 16 of the seat back 14 is an integrated frame 16 so that the frame 16 collectively includes a head restraint frame portion 22 and a back support frame portion 24 integrated into the frame 16. An integrated frame 16 is commonly used in sports vehicles. With the increase in popularity of sport vehicles, integrated frames 16 also have increased popularity. When covered by the cushioning 18, the head restraint frame portion 22 supports a head of the occupant and has limited height adjustment relative to the back support portion 24.

The back support frame portion 24, when covered by the cushioning 18 as illustrated, supports the back of the occupant and is an integral portion of the frame 16. The head restraint frame portion 22 and the back support frame portion 24 are contoured to be generally flush so that neither the head restraint frame portion 22 nor the back support frame portion 24 covered by cushioning 18 extend farther than the other. The back support frame portion 24 is designed to comfortably support the back of the occupant by providing a generally flat surface which is flush with the head restraint frame portion 22 and curved portions on either side of the flat surface. Any suitable design for the back support frame portion 24 is contemplated within the scope of the present invention.

In the depicted embodiment, the head restraint frame portion 22 has a head restraint 42 supported by the head restraint frame portion 22. The head restraint 42 need not be directly mounted to the head restraint frame portion 22 and may be mounted indirectly to the head restraint frame portion 22 in any suitable manner. The head restraint 42 may be located in a residing area 44 provided in the head restraint frame portion 22. The head restraint 42 is moveable between two positions and is made of a foam material or any suitable material known in the art. Of course the motion of the head restraint 42 may be linear or nonlinear movement. FIG. 1 illustrates a design position for normal driving conditions. The head restraint 42 is moveable to an extended position by an active head restraint system 26 for minimizing potential for injury of an occupant. The extended position may be any position with any movement of the head restraint 42 when compared to the design position. The head restraint 42 when covered by cushioning 18 forms a part of a surface of the head restraint frame portion 22 and is surrounded by the remaining head restraint frame portion 22.

In the past, active head restraint systems have been limited to vehicle seats with a separate seat back and head restraint which do not have the integrated frame 16. The multiple embodiments of the present invention incorporate the moveable head restraint 42 supported by the head restraint frame portion 22 and the active head restraint system 26 into the integrated frame 16 to make active head restraint systems 26 in integrated frames 16 available.

Figure 2:
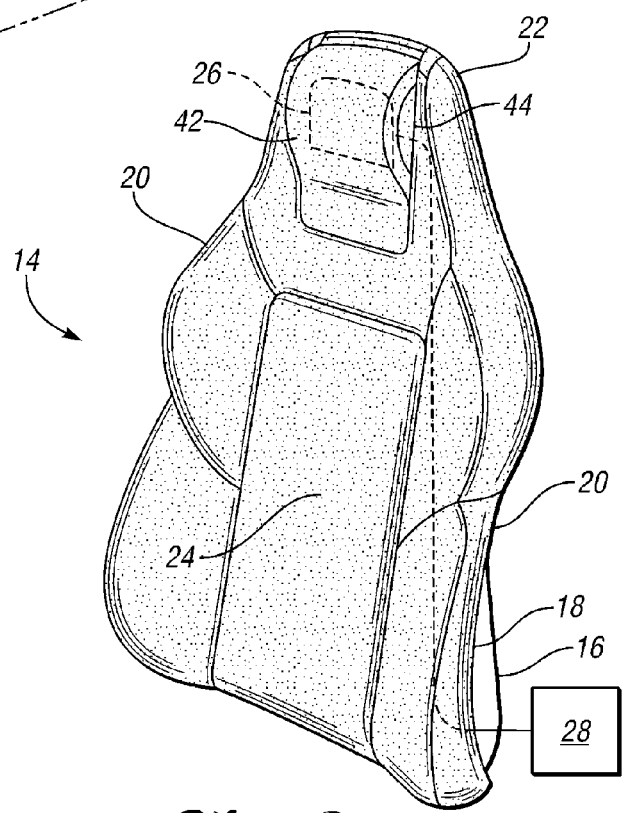
FIG. 2 is a perspective view of a seat back of the vehicle seat of FIG. 1 illustrated with a head restraint in an extended position.

Referring now to FIG. 2, the seat back 14 of FIG. 1 is illustrated with the head restraint 42 moved to the extended position from the design position of FIG. 1. The active head restraint system 26 moves the head restraint frame portion 22 from the design position, as in FIG. 1, to the extended position depicted. The active head restraint system 26 helps to minimize whiplash injury to an occupant by extending the head restraint 42 toward the head of the occupant. A whiplash injury occurs when the occupant's head is over-extended during an impact condition. When the vehicle is impacted by another object, the seat 10 is accelerated into the occupant, and the back of the occupant moves a distance into the seat back frame portion 24. Accordingly, the head restraint 42 is moved toward the head of the occupant to support the occupant's head to minimize potential for injury to the occupant.

In FIG. 2, the active head restraint system 26 is in the extended position. The head restraint 42 is mounted directly onto the frame 16 and is covered by the cushioning 18 and the cover 20 so that the assembled seat back 14 has a contour in the extended position which is not separate from the head restraint frame portion 22. The active head restraint system 26 has actuated the head restraint 42 from head restraint frame portion 22 to the extended position.

In one embodiment, the active head restraint system 26 is connected to a controller 28, which provides an input signal to the active head restraint system 26 to actuate the head restraint 42 to the deployed position. In another embodiment, the controller 28 includes a limit switch 28. The limit switch 28 responds to a mechanical input provided by an input force received from the occupant which exceeds a predetermined force. The limit switch 28 may be any suitable limit switch 28 known in the art. When the limit switch 28 is actuated, the limit switch 28 sends a signal to the active head restraint system 26.

In another embodiment, the controller 28 sends an electrical signal to the active head restraint system 26 when a predetermined event actuates the controller 28. A non-limiting example of the predetermined event is when the seat back 14 receives a force of the occupant against the seat back 14. In another example, the predetermined event is an impact on the front or rear bumper of the vehicle which is detected by sensors. Any suitable manner of determining a predetermined event has occurred and then sending a signal from the controller 28 to the active head restraint system 26 such as those known in the art is contemplated within the scope of the present invention.

The controller 28 is activated, for example, when the vehicle is impacted by another object thereby accelerating the seat back 14 into the occupant and creating an impact condition. The impact condition may be generated from a rear impact. Likewise, the impact condition may be generated from a forward impact wherein the occupant rebounds from a seat harness or other mechanism, into the seat. If the force of the occupant exceeds a predetermined force, then the controller 28 sends a signal to the active head restraint system 26 to actuate the system. In another embodiment, the activation of the controller 28 is generated when the vehicle exceeds a predetermined acceleration before the impact condition occurs.

In another embodiment, the controller 28 is activated by an output of a sensor provided in the vicinity of a bumper of the vehicle such that the sensor detects an impending impact and then activates the controller 28. Any suitable sensor such as those known in the art may be employed. In yet another embodiment, the controller 28 is activated by an output of a limit switch which detects a possible external impact. Any suitable limit switch such as those known in the art is contemplated within the scope of the present invention. In still another embodiment, the controller 28 is activated by an output of an inertia switch such that a specified change in momentum of the vehicle causes the inertia switch to activate the controller 28.

Upon activation of the controller 28, the controller 28 drives the active head restraint system 26 to deploy the head restraint frame portion 22 from the design position, illustrated in FIG. 1, to the extended position, illustrated in FIG. 2. In the extended position, the head restraint 42 is oriented closer to the head of the occupant than in the design position.

After the head restraint 42 is in the extended position, the active head restraint system 26 may return the head restraint 42 to the design position. In another embodiment, the active head restraint system 26 allows the head restraint 42 to return to the design position after actuation to the extended position. In yet another embodiment, after the head restraint 42 is in the extended position, the controller 28 sends a signal to the active head restraint system 26 to return the head restraint 42 to the design position. In still another embodiment, the active head restraint system 26, in the extended position, must be manually returned to the design position.

Figure 3:
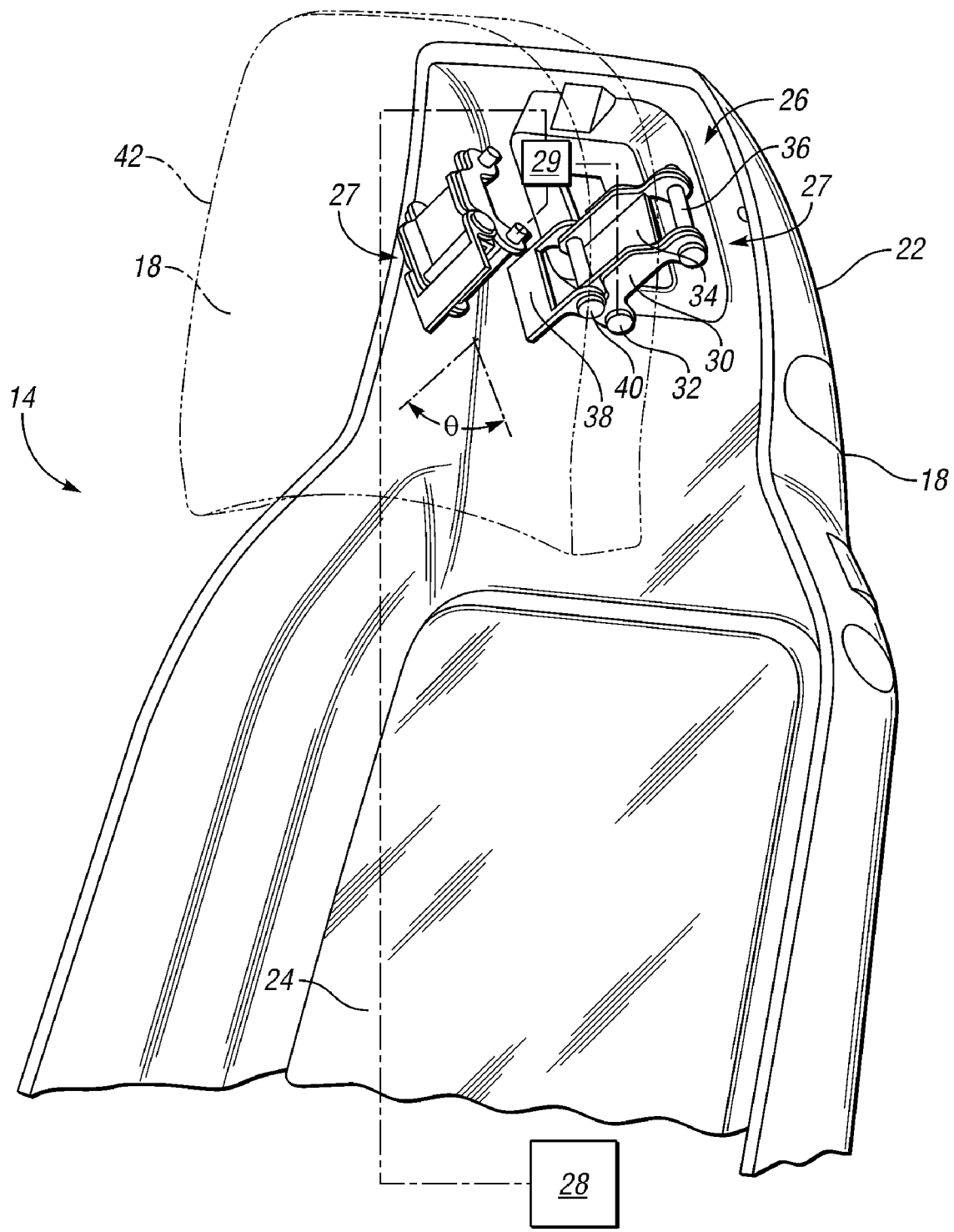
FIG. 3 is a perspective view of a portion of another embodiment of a seat back of a vehicle seat.
Figure 4:
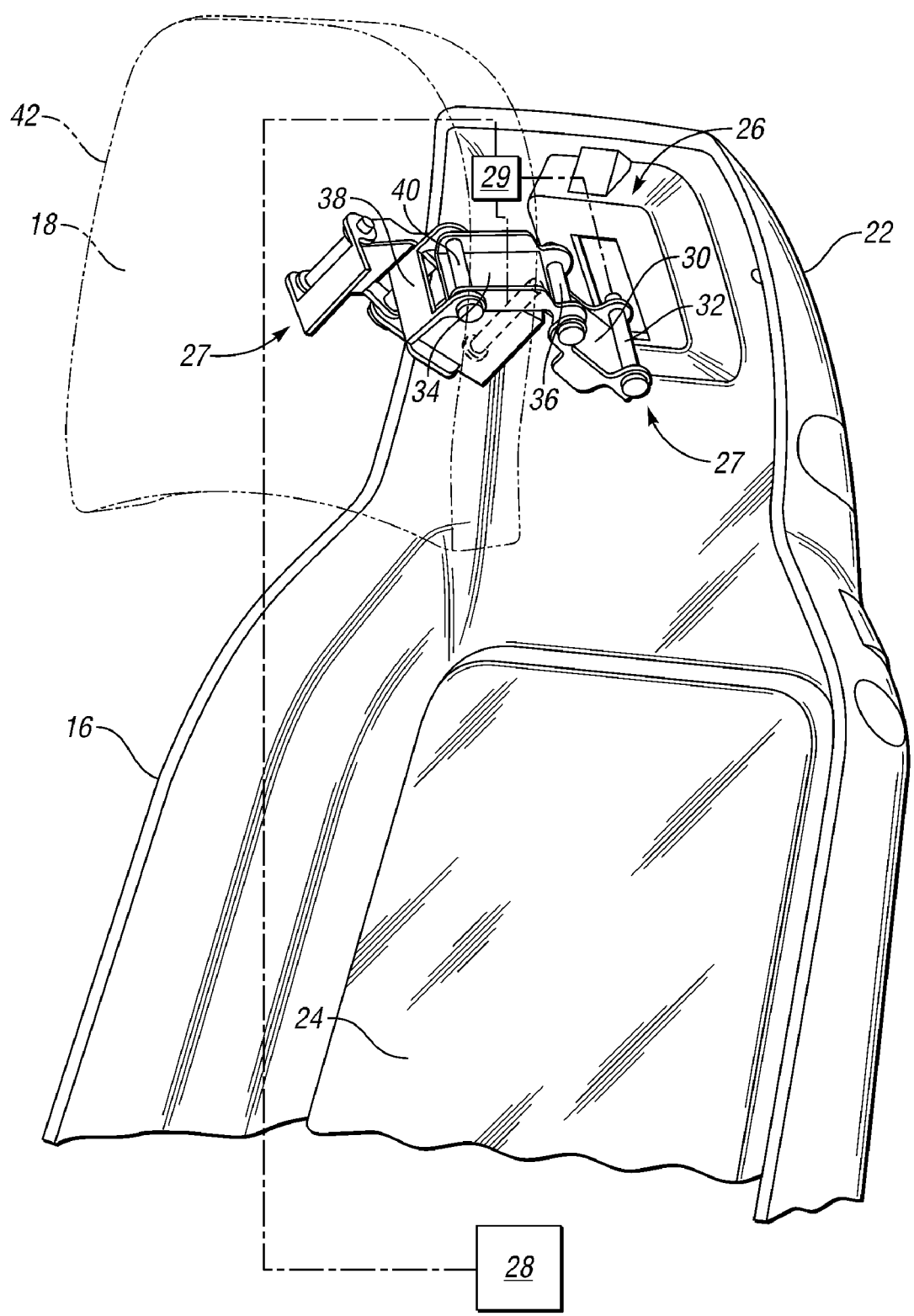
FIG. 4 is a perspective view of the seat back of FIG. 3 with a head restraint in an extended position.

With reference to FIGS. 3 and 4, a portion of a seat back 14 is illustrated with a cover and a portion of cushioning 18 removed. The seat back 14 has a frame 16 for providing the structural support for the entire seat back 14. A head restraint frame portion 22 extends from a back support frame portion 24 of the frame 16. The head restraint frame portion 22 supports an active head restraint system 26, which moves the cushioning 18 to accommodate a head of an occupant. The active head restraint system 26 moves the head restraint 42 to move from a design position, illustrated in FIG. 3 to an extended position, illustrated in FIG. 4.

The active head restraint system 26 includes a linkage 27 for moving the head restraint 42 to the extended position. The linkage 27 includes a first link 30 pivotally mounted to the frame 16 with a first shaft 32. The first link 30 is pivotally mounted, at an end opposite the pivotal mounting to the frame 16, to a second link 34 with a second shaft 36. The second link 34 is pivotally mounted, at an end opposite the pivotal mounting to the first link 30, to a bracket 38 with a third shaft 40. The bracket 38 is mounted to the head restraint 42 at an end opposite the pivotal mounting to the second link 34. In one embodiment, the bracket 38 is mounted to the head restraint 42 by adhesive or a fastener. In another embodiment, the bracket 38 is inserted molded on the head restraint 42. Any suitable mounting of the bracket 38 to the head restraint 42 is contemplated within the scope of the present invention.

The first link 30 pivots about the first shaft 32 and the second link 34 pivots about the second shaft 36 to extend the head restraint 42 toward the extended position. The extension of the head restraint 42 toward the extended position may be any type of linear and/or nonlinear movement. Movement of the first link 30 and the second link 34 is simultaneous. The bracket 38 is mounted to the head restraint 42 so that the head restraint 42 moves as the first and second links 30, 34 extend the head restraint 42 to the extended position illustrated. The collective distance traversed by the first link 30 and the second link 34 forces the head restraint 42 to the extended position.

As illustrated in FIG. 3, first and second linkages 27 are mounted between the frame 16 and the head restraint 42. The first and second linkages 27 are mounted at an angle to each other having an angle Θ, where Θ may be the angle between the center-line of the first and second linkages 27. For stability, the angle Θ may be a non-zero angle, or in other words, the angle Θ may be where the centerlines of the first and second linkages 27 are non-parallel. In one embodiment angle Θ is approximately equal to ninety degrees to maximize stability the head restraint 42 in the extended position, or in other words, the first and second linkages 27 are mounted so that centerlines of the first and second linkages are perpendicular to each other, as illustrated in FIG. 4.

As depicted in FIGS. 3 and 4, the first and second linkages 27 include a pair of first links 30, second links 34, and brackets 38 provide stabilized and uniform motion so that the head restraint 42 and brackets 38 maintain radial orientation relative to the frame 16 while moving linearly away from the frame 16. Any quantity of first links 30, second links 34, and brackets 38 is contemplated within the scope of the present invention.

Any suitable shaft 32, 36, 40 which may be used for mounting and allows rotary motion is contemplated within the scope of the present invention. A non-limiting example of a shaft 32, 36, 40 is a fastener with a head oriented at one end of the fastener.

The active head restraint system 26, including the first links 30, the second links 34, and the brackets 38, is compact when oriented in the design position of FIG. 3 so that the head restraint 42 may be generally flush with the head restraint portion 22. The head restraint 42 need not be flush with the head restraint portion 22 when in the design position. When in the extended position of FIG. 4, the active head restraint system 26 moves the head restraint 42 a specified distance to support the head of the occupant. The specified distance may be at least twice the amount of a thickness of the active head restraint system 26 when oriented in the design position. When the active head restraint system 26 is in the extended position, the first link 30, the second link 34, and the bracket 38 are relatively stable so that the head restraint frame portion 22 does not move in unintended directions.

In the illustrated embodiment, the active head restraint system 26 is driven by an actuator 29. The actuator 29 may be a linear solenoid 29 which is connected to the controller 28 at an input end to receive a signal from the controller 28 and to the active head restraint system 26 at an output end to drive the active head restraint system 26. Any known linear solenoid 29 is contemplated within the scope of the present invention. In another embodiment, the actuator 29 is a rotary solenoid 29 which is connected to the controller 28 at an input end and to the active head restraint system 26 at an output end. Any known rotary solenoid 29 is contemplated within the scope of the present invention. In yet another embodiment, the actuator 29 is a spring and a latch release 29 such that activation of the latch release 29 permits the spring move the active head restraint system 26. Any suitable actuator 29 which can drive the active head restraint system 26 is contemplated within the scope of the present invention.

When the controller 28 is activated, the controller 28 sends an input signal to the actuator 29. Upon receipt of the input signal by the actuator 29, the actuator 29 drives the active head restraint system 26 to the extended position, illustrated in FIG. 4.

Figure 5:
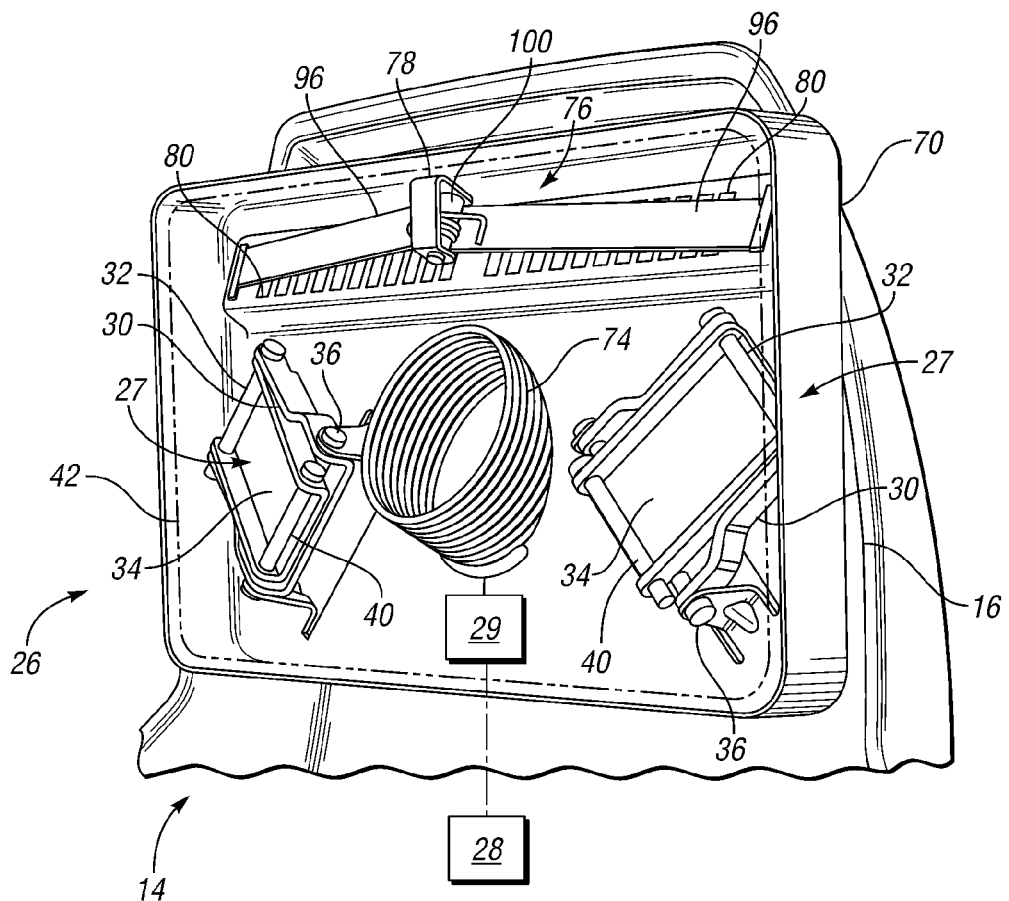
FIG. 5 is a perspective view of another embodiment of the seat back of FIG. 3.

Referring to FIG. 5, an embodiment of the seat back 14 of FIG. 3 is illustrated. The active head restraint system 26 has a stationary portion 70 which is supported by the frame 16. The active head restraint system 26 also may have a moveable head restraint 42. The stationary portion 70 may be connected to the moveable head restraint 42 by a pair of actuatable linkages 27. As illustrated, each linkage 27 has a first link 30 and a second link 34. The first link 30 and the second link 34 are pivotally connected with a shaft 32. The first link 30 is mounted to the stationary portion 70 by a second shaft 36. The second link 34 is mounted to the moveable head restraint 42 and/or the cushioning 18 of FIG. 3, by a third shaft 40.

Figure 6:
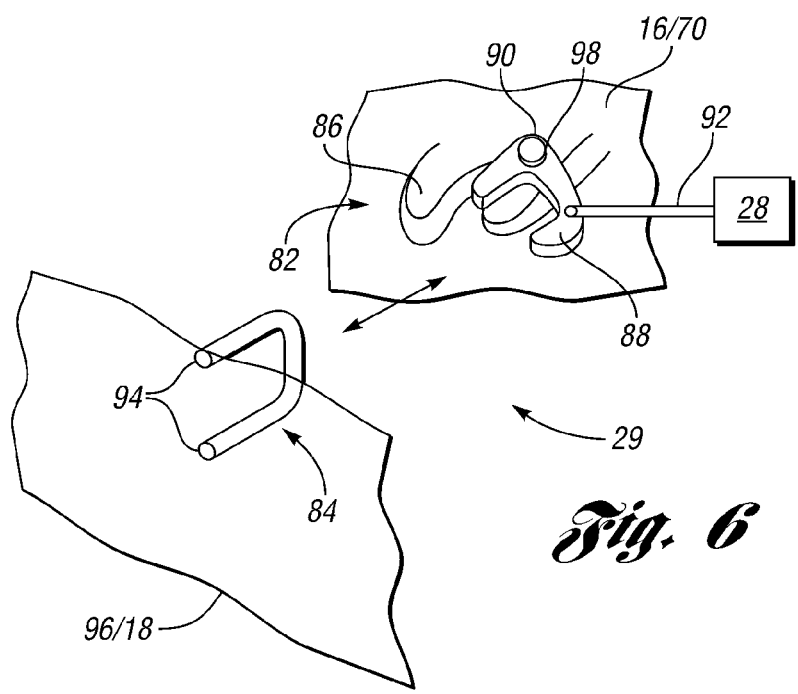
FIG. 6 is a perspective view of an embodiment of a latch mechanism of FIG. 5.

The active head restraint system 26 is released from the design position illustrated in FIG. 3 by an actuator 29. In one embodiment, the actuator 29 is a latch mechanism 29 which is illustrated in FIG. 6. The latch mechanism 29 has a latch 82 and a striker 84 which are depicted when the head restraint 42 is in the extended position. Any known latch and striker are contemplated within the scope of the present invention. The latch 82 is mounted to the frame 16 in one embodiment. In another embodiment, the latch 82 is mounted to the stationary portion 70. As illustrated, the striker 84 is mounted to the moveable head restraint 42. In another embodiment, the striker 84 is mounted to cushioning 18 of FIG. 3.

As illustrated in FIG. 6, the latch 82 has a receiver 86 to receive the striker 84. In a locked position which occurs when the head restraint 42 is in the design position, a moveable pawl 88 secures the striker 84 within the receiver 86 of the latch 82. The pawl 88 is mounted to the receiver 86 by a fastener 90 which may include a spring 98. The pawl 88 may be released from the locked position by a cable 92. The cable 92 may be activated by a signal system 28. In another embodiment, the cable 92 is mechanically activated by a force such as an impact force. Any suitable activation of the cable 92 is contemplated within the scope of the present invention.

Referring again to FIG. 5, the actuator 29 retains the moveable head restraint 42 in the design position illustrated. Once the actuator 29 is activated, the moveable head restraint 42 is moved to the extended position, illustrated in FIG. 4, by a spring 74. In one embodiment, the spring 74 is a conical compression spring. In another embodiment, the spring 74 is a helical compression spring. Any suitable spring 74 is contemplated within the scope of the present invention. The linkages 27 guide the moveable head restraint 42 to the extended position.

An optional locking mechanism 76 is depicted in the present embodiment. The locking mechanism 76 allows the moveable head restraint 42 to move when activated and then locks the moveable head restraint 42 in the extended position to facilitate support of the head of the occupant by the head restraint 42. The locking mechanism 76 has an intermediate portion 78 which supported by the head restraint 42. The intermediate portion 78 is connected to locking legs 96 which are rotatably biased by a spring 100 mounted on the intermediate portion 78 as illustrated. As the head restraint 42 moves to the extended position, the intermediate portion 78 extends the locking legs 96. The locking legs 96 slide along teeth 80 which may be formed into the stationary portion 70. If the head restraint 42 is in the extended position which is not fully extended and is pushed toward the frame 16 in an opposite direction of travel by the head of the occupant or other impact force, then the teeth 80 lock the head restraint 42 from moving in this opposite direction by stopping the locking legs 96.

Figure 7:
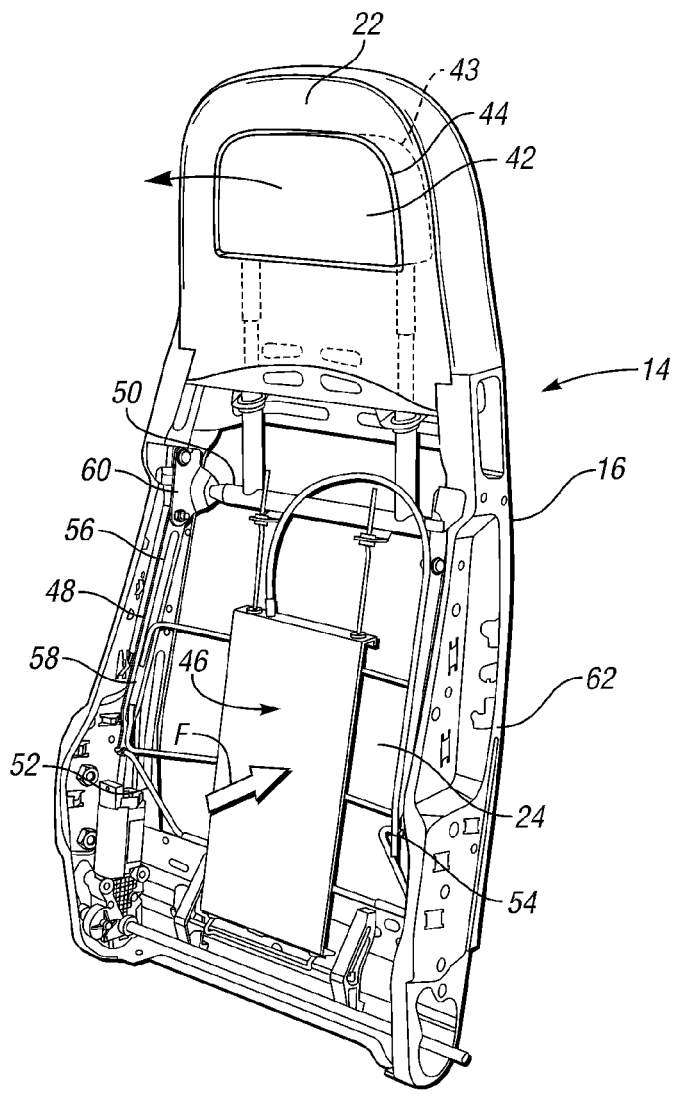
FIG. 7 is a perspective view of another embodiment of a vehicle seat.
Figure 8:
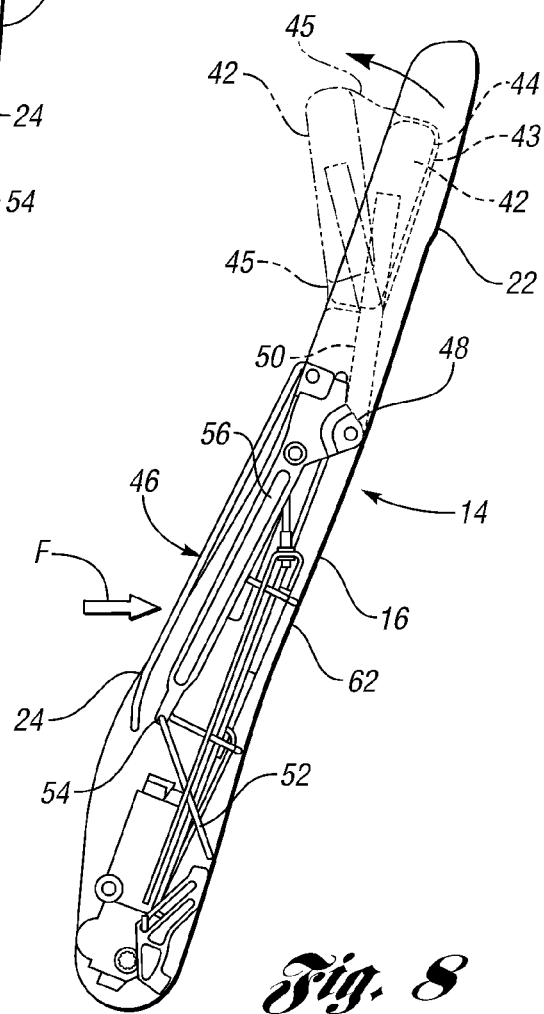
FIG. 8 is a fragmentary side elevation view of a portion of the vehicle seat of FIG. 7.

Referring now to FIGS. 7 and 8, a seat back 14 is illustrated with a cover and cushioning removed for depicting internal components. The head restraint frame portion 22 of the frame 16 has a head restraint 42 supported thereon. The head restraint 42 may be provided in a head restraint residing area 44. The head restraint 42 forms a part of the head restraint frame portion 22 and is surrounded by the remaining head restraint frame portion 22. A clearance 43 may be provided between the head restraint 42 and the residing area 44 to facilitate motion of the head restraint 42 from a design position to a deployed position. In one embodiment, the head restraint 42 has a flexible shroud 45 extending from the head restraint 42 to the residing area 44 so that, when in the design position, the head restraint frame portion 22 appears to be one piece and when in an extended position, the active head restraint system 26 is not visible. Any suitable shroud 45 may be utilized such as a shroud 45 employing a fabric or polymeric material.

In the depicted embodiment, the seat back 14 includes an adjustable lumbar support 46 for providing lumbar support to the occupant, while providing adjustability so that the occupant can select a desired level of comfort and support. The lumbar support 46 may be an input to actuate the head restraint frame portion 22 to the extended position. For example, the lumbar support 46 is connected to a linkage 48 so that upon receipt of an impact to the lumbar support 46, such as a body of the occupant that exceeds a predetermined force F, the lumbar mechanism 46 actuates the linkage 48. The output of the linkage 48 may be the head restraint 42 mounted on an armature 50, such that the head restraint 42 is moved forward and upward relative to the seat back 14, as illustrated by an arcuate arrow in FIGS. 7 and 8. Such an active head restraint system is further disclosed in U.S. patent application Ser. No. 11/538,485 filed on Oct. 4, 2006, which is hereby incorporated in its entirety by reference herein.

The linkage 48 may be a four-bar mechanism. The linkage 48 includes a lower link 52, which is pivotally connected to the frame 16. The lower link 52 may terminate at its distal ends with lateral extensions 54 that each provide a pivotal connection with a coupler link 56 at each lateral side of the linkage 48. The coupler links 56 extend upward within the seat frame 16. In one embodiment, the lumbar support 46 is mounted to the input points 58, which are secured to the coupler links 56. Thus, the lumbar support 46 is mounted to the linkage 48 through the coupler links 56. An upper end of each coupler link 56 is pivotally connected to an upper link 60 at a pivotal connection therebetween. The upper links 60 are each pivotally connected to an upper region of side supports 62 of the frame 16. The links 52, 56, 60 and the frame 16 collectively provide a four-bar mechanism, such as a four-bar linkage 48 for actuation of the active head restraint mechanism 26.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A seat back for a vehicle seat comprising:
   a one piece frame providing structure for the seat back and adapted to be mounted within a vehicle, the frame having a back support portion to support a back of an occupant that is integrally formed with a head restraint portion to support a head of an occupant;
   a head restraint supported by the head restraint portion of the frame, the head restraint being moveable relative to the frame to an extended position to provide support to the head of the occupant during an impact condition; and
   an active head restraint system operatively connected to the head restraint for moving the head restraint to the extended position when the active head restraint system is activated, the active head restraint system having a first linkage and a second linkage each connected to the frame and the active head restraint to move the active head restraint to the extended position such that the first linkage and the second linkage are mounted at an angle relative to each other so that the first and second linkages are not parallel in order to provide stability for the active head restraint system.

2. The seat back of claim 1 wherein the first linkage and the second linkage each further comprise:
   a first link pivotally connected to the frame; and
   a second link pivotally connected to the head restraint such that the first and second links of each of the first linkage and the second linkage collectively move the head restraint to the extended position.

3. The seat back of claim 2 further comprising:
   a spring mounted to the frame and the head restraint between the first linkage and the second linkage; and
   a latch mechanism mounted to the frame and cooperating with the head restraint to release the head restraint such that the spring moves the head restraint to the extended position.

4. The seat back of claim 2 further comprising a locking mechanism to lock the head restraint in the extended position.

5. The seat back of claim 2 further comprising a pair of brackets pivotally connecting each of the second links to the head restraint.

6. The seat back of claim 2 wherein each of the second links is collapsible onto each of the first links.

7. The seat back of claim 1 wherein the head restraint portion has a residing area therein sized to receive the head restraint.

8. The seat back of claim 7 further comprising cushioning and a cover mounted on the frame such that the cushioning and the cover collectively cover the head restraint in the residing area and the head restraint frame portion to provide an appearance of a generally uniform surface.

9. The seat back of claim 8 wherein a shroud extends from the head restraint portion to the head restraint to cover the residing area.

10. The seat back of claim 1 wherein the active head restraint system further comprises an actuator operatively connected to the head restraint to drive the head restraint to the extended position.

11. The seat back of claim 10 wherein the active head restraint system further comprises a controller in operative connection with the actuator such that the controller sends a signal to the actuator so that the actuator moves the head restraint to the extended position.

12. The seat back of claim 11 wherein the head restraint is moved to the extended position upon receipt of a predetermined force by the active head restraint system during the impact condition.

13. The seat back of claim 12 wherein the active head restraint system receives the predetermined force from the occupant in response to the impact condition.

14. The seat back of claim 1 further comprising:
   a seat bottom adapted to be mounted within the vehicle for supporting an occupant;
   a seat back mounted to the seat bottom and having the one piece frame providing structure.

15. The vehicle seat of claim 14 wherein the first linkage and the second linkage each further comprise:
   a first link pivotally connected to the frame; and
   a second link pivotally connected to the head restraint such that the first and second links of each of the first linkage and the second linkage collectively move the head restraint to the extended position.

16. A seat back for a vehicle seat, the seat back comprising:
   an integrated frame providing structure for the seat back and adapted to be mounted within a vehicle, the frame having an integral back support portion to support a back of an occupant and an integral head restraint portion to support a head of an occupant such that the integrated frame is one continuous member;
   a head restraint mounted to the integral head restraint portion of the frame, the head restraint being moveable relative to the frame to provide support to the head of the occupant during an impact condition;
   a first linkage having a first link pivotally connected to the frame, and a second link pivotally connected to the first link and collapsible upon the first link, and a bracket pivotally connected to the second link and supported by the head restraint; and a second linkage separate from the first linkage and provided at an angle relative to the first linkage so that the first and second linkages are not parallel, the second linkage having a third link pivotally connected to the frame, and a fourth link pivotally connected to the third link and collapsible upon the third link, and a bracket pivotally connected to the fourth link and supported by the head restraint;

wherein the first and second linkages collectively move the head restraint to an actuated position upon receipt by the active head restraint system of an input signal and the first linkage and the second linkage provide stability for the active head restraint system.

17. The seat back of claim 16 further comprising:
a spring mounted to the frame and the head restraint between the first linkage and the second linkage; and
a latch mechanism mounted to the frame and cooperating with the head restraint to release the head restraint such that the spring moves the head restraint to the extended position.

18. A seat back for a vehicle seat, the seat back comprising:
a one piece frame providing structure for the seat back and adapted to be mounted within a vehicle, the frame having a back support portion to support a back of an occupant that is integrally formed with a head restraint portion to support a head of an occupant;

a head restraint supported by the head restraint portion of the frame, the head restraint being moveable relative to the frame to an extended position to provide support to the head of the occupant during an impact condition; and an active head restraint system for moving the head restraint to the extended position when the active head restraint system is activated, the active head restraint system including an actuator operatively connected to the head restraint to drive the head restraint to the extended position, a controller in communication with the actuator, a first linkage mounted to the frame and the head restraint, and a second linkage separate from the first linkage and mounted to the frame and the head restraint to move the head restraint to the extended position, wherein the controller sends a signal to the actuator during an impact condition so that the actuator moves the head restraint and the first and second linkages to the extended position, the first and second linkages provide stability for the active head restraint system.

19. The seat back of claim 1 wherein the first and second linkages are generally perpendicular to each other.

20. The seat back of claim 1 wherein the first and second linkages are mounted separate from each other.

* * * * *